March 15, 1949.  E. E. LANDAHL  2,464,590
OVERLOAD RELEASING MECHANISM FOR
POWER TRANSMITTING SYSTEMS
Filed Sept. 24, 1947  2 Sheets-Sheet 1

Inventor
Eugene E. Landahl
By W. S. McDowell
Attorney

March 15, 1949.					E. E. LANDAHL					2,464,590
OVERLOAD RELEASING MECHANISM FOR
POWER TRANSMITTING SYSTEMS
Filed Sept. 24, 1947					2 Sheets-Sheet 2
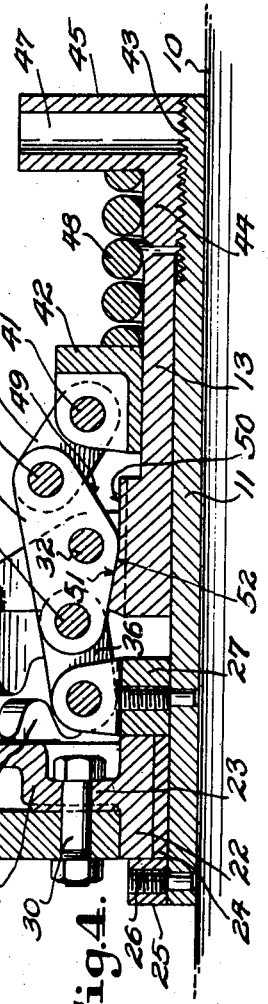
Fig. 5.
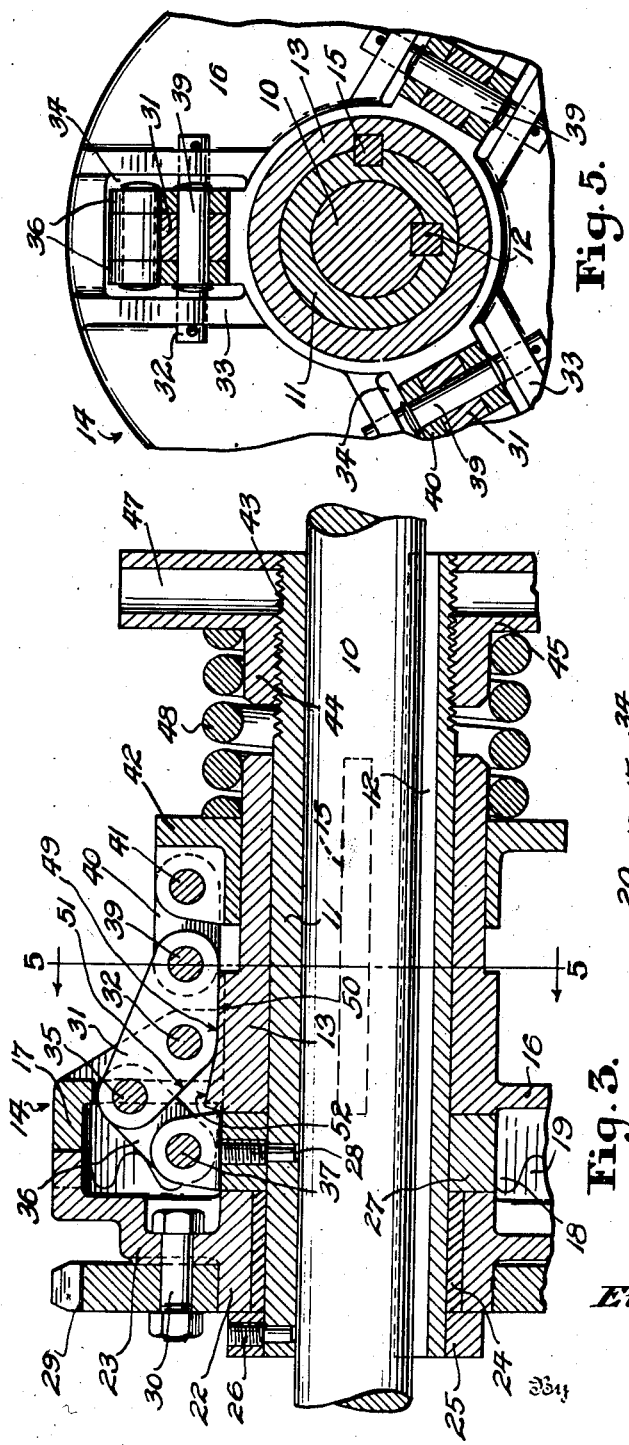
Fig. 3.
Fig. 4.
Inventor
Eugene E. Landahl
W. S. McDowell
Attorney Patented Mar. 15, 1949

2,464,590

UNITED STATES PATENT OFFICE 2,464,590

OVERLOAD RELEASING MECHANISM FOR POWER TRANSMITTING SYSTEMS

Eugene E. Landahl, Detroit, Mich.

Application September 24, 1947, Serial No. 775,789

4 Claims. (Cl. 192—56)

1

This invention relates to an improved overload-releasing mechanism for power-transmitting means; and has for its object to provide a simple and positive mechanism so constructed that in the event a driven element of the power-transmitting means should, when in operation, encounter loads in excess of those for which the system as a whole is designed to bear, a pair of normally coupled parts, having interengaged teeth held together under spring pressure, will separate, thereby interrupting the transmission of power through said parts and protecting the system automatically against mechanical injury.

For a further understanding of the invention, reference is to be had to the following description and the accompanying drawings, wherein:

Fig. 3 is an enlarged vertical longitudinal sectional view taken through the mechanism and disclosing the positions of its clutch members when in driving relationship;

Fig. 4 is a similar view disclosing the clutch members when separated;

Fig. 5 is a vertical transverse sectional view on the line 5—5 of Fig 3.

Figures 1, 2:
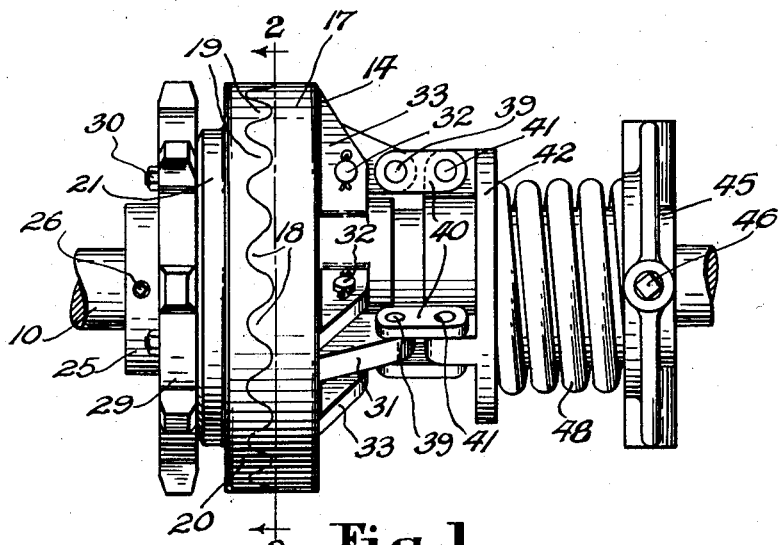
Fig. 1 is a side elevational view of an overload-releasing mechanism constructed in accordance with the present invention.
Fig. 2 is a vertical transverse sectional view taken through the mechanism on the plane indicated by the line 2—2 of Fig. 1.

Referring more particularly to the drawings, my improved overload-releasing mechanism, in the specific embodiment thereof illustrated, comprises a driven shaft 10 which is suitably supported for rotation in bearings, not shown. Carried by and rotatable with the shaft 10 is a sleeve 11, the shaft and the sleeve being formed with registering keyways for the reception of a key 12 employed in uniting the shaft and sleeve for rotating in unison. Slidably positioned on the sleeve 11 for rotation therewith is the cylindrical hub 13 of a driven clutch member 14, the sleeve 11 and the hub 13 being formed with registering keyways for the reception of a key 15, as shown in Fig. 5, whereby the driven clutch member rotates in unison with the shaft 10 and the sleeve 11 but is allowed to slide longitudinally for a limited distance thereon.

The driven clutch member includes an integral circular wall 16 which terminates preferably in

2 a laterally and longitudinally directed annular flange 17, formed, as shown in Fig. 4, with relatively wide serrated teeth 18. These teeth normally mesh with similar teeth 19 provided on the annular peripheral flange 20 of a driving clutch member 21. In this instance, the driving member 21 is formed with a hub 22 and a wall 23 which integrally unites the hub 22 with the flange 20, the hub 22 rotating freely or loosely about the forward end of the sleeve 11, the hub being provided with a lining material, as indicated at 24.

While the driving clutch member 21 may rotate freely about the longitudinal axis of the shaft means provided by the shaft 10 and the sleeve 11, it is restrained against longitudinal movement on said shaft means by the provision of a fixed collar 25 positioned on the forward end of the sleeve 11, the collar being held on the sleeve by the provision of dog-point set screws 26. Also, the sleeve 11 carries a second collar 27 on the inner side of the hub 22 of the driving clutch member, the collar 27 being secured to the sleeve through the use of the dog-point set screws indicated at 28.

Any suitable means may be employed for imparting rotation to the driving clutch member. In this instance, a sprocket wheel 29 has been shown as positioned on the hub 22 of the member 21 and bolted thereto as at 30, the wheel 29 being suitably rotated. Thus rotating power is applied to the driving clutch member 21 and, through the intermeshing teeth 18 and 19, this power is transmitted to the driven clutch member 14 and thence to the shaft 10.

In the event of the application of overloading forces to the drive mechanism, provision is made for separating automatically the normally interengaged teeth 18 and 19, as shown in Figs. 3 and 4. Advantageously, this separating mechanism comprises a plurality of radially arranged rocker arms 31, which, intermediately of their ends, are pivotally supported by means of pins or rivets 32 carried by lug extensions 33 forming an integral part of the clutch member 14. The forward end of the arms 31 are located in opening 34 provided in the wall 16 of the clutch member 14 and are pivotally connected, as at 35, to the outer or rear ends of links 36, the inner or forward ends of the links 36 being pivotally connected, as at 37, with ears 38 formed with and projecting outwardly from the collar 27.

The rear ends of the rocker arms 31 are pivotally united as at 39 to the forward ends of a second set of links 40, the rear ends of the links 40 being pivoted as at 41 to a ring member 42 which is slidably mounted on the hub 13 of the clutch member 14. The rear end of the sleeve 11 is externally threaded as at 43 to receive the internally threaded hub 44 of an adjustable abutment in the form of a collar 45, the adjustment of which on the sleeve may be maintained by one or more set screws, shown at 46. The collar 45 may be provided with radial wrench-receiving sockets 47.

A coil spring, shown at 48, is positioned around the hub 13 of the clutch member 14 and the hub 44 of the collar 45, said spring being confined between the ring member 42 and the collar 45 in such manner that its expansive energy is directed on the ring member and thence through the links 40 and the rocker arms 31 on the driven clutch member 14, whereby to maintain the teeth 18 of said latter member normally in engagement with the teeth 19 of the driving member.

In view of the foregoing, it will be seen that when an overloading condition is applied to the shaft 10, the rate of rotation of the driven clutch member 14 tends to decrease with respect to the relatively constant rate of rotation of the driving clutch member 21. This slight variance in rotational speeds establish forces causing the curved or serrated teeth 18 and 19 of the clutch members to separate. As the driven clutch member moves longitudinally on the sleeve 11, corresponding movement is imparted to the arm pivots 32, and since the rocker arms 31 on the pivots 32 are united by the links 36 with the collar 27, the forward ends of the rocker arms are moved inwardly and radially, raising the rear ends of the rocker arms and allowing the spring 48 to positively act on the links and rocker arms to hold the driven clutch member out of engagement with the driving clutch member.

It will be noted that the rocker arms at their inner or lower edges are provided with flat edge surfaces 49 which engage with corresponding surfaces 50 provided on the hub 13 of the driven clutch member 14, the surfaces 49 and 50 being in engagement when the driving and driven clutch members are in coupled relation. When the clutch members are separated, as in Fig. 4, the edge surfaces 51 of the rocker arms, disposed in angular relationship to the surfaces 49, are in contact with complemental surfaces 52 formed with the hub 13 in angular relationship to the surfaces 50. These surfaces limit in a positive manner the degree of rocking movement of said arms.

When the clutch halves or members are coupled, as in Fig. 3, it will be noted that the pivots 32, 37, 39 and 41 are disposed substantially in longitudinal alignment, so that the thrust of the spring 48 will be so directed on the links and rocker arms as to maintain the clutch members in driving engagement. However, when the clutch members separate, under an overloading condition, the pivots 39 move outwardly and radially so that they are no longer in alignment with the pivots 32, 37 and 41, thus enabling the force of the spring, applied to the ring member 42, to hold the rocker arms in the position of Fig. 4 and holding the clutch members separated. This link mechanism and also the clutch mechanism are both very sensitive in their action, and are made so that the greatest torque load moment is exerted, at the very start of power through the clutch, and any movement of either the links or the clutch halves tending to change this condition will cause the mechanism to throw out easily.

The load for releasing may be set very accurately by simply screwing the collar or hub 45 into its desired position on the end of the sleeve 11, and maintaining such position by set screw control. It will be observed that the position of the collar or ring member 42 changes but slightly in the operation of the clutch mechanism, so that the compression of the spring remains substantially constant. This is desirable in extending the operating life of the apparatus. With the release coupling in its open position, as in Fig. 4, the same may be restored to its closed or driving position by manually rocking the outer ends of the arms 31 in an inward direction, after backing off the hub 45.

While I have described what I consider to be the preferred form of my improved overload-release coupling, nevertheless it will be understood that the construction is subject to certain mechanical changes without departing from the spirit and scope of the following claims.

I claim:

1. An overload-releasing mechanism for power-transmitting systems, comprising a rotatable shaft means, a driving clutch member freely rotatable about the axis of said shaft means, a driven clutch member slidably mounted on said shaft means for rotating in unison therewith, said members being formed with mating peripheral flanges having interengageable teeth, rocker arms pivoted intermediate the ends thereof on said driven clutch member, links having their outer ends pivotally connected with the forward ends of said arms and inner ends with said shaft means, a ring member slidably mounted on said shaft means, a second set of links having forward ends pivotally connected with the rear ends of said rocker arms and rear ends pivotally connected with said ring member, an abutment element on said shaft means adjustable longitudinally with respect thereto, and a coil spring surrounding said shaft means and interposed between said abutment element and ring member and acting on said links and arms to maintain normally the teeth of said clutch members in driving engagement.

2. In a power transmission, a rotatable shaft means, driving and driven coupling members, one of said members being freely rotatable on and about the longitudinal axis of said shaft means, the other of said members being mounted on said shaft means for rotation in unison therewith and for sliding longitudinal movement on said shaft means, said members being formed with interengageable jaw teeth, a ring member mounted on and slidable longitudinally with respect to said shaft means, rocker arms pivotally connected intermediately of their length with the slidable coupling member, links pivotally connecting the forward ends of said rocker arms with said shaft means, a second set of links pivotally connecting the rear ends of said rocker arms with said ring member, an abutment element on said shaft means, and an expansible coil spring disposed around said shaft means between said abutment element and said ring member.

3. In a power transmitting system as defined in claim 2 and wherein the rocker arms are formed with relatively angularly disposed edge surfaces engageable with complemental angularly disposed surfaces on said movable coupling member to limit the extent of oscillation of said rocker arms.

4. In a power transmitting system as defined in claim 2 and wherein said spring abutment element is threadedly mounted on said shaft means to control the compression of said spring and to provide for the separation of said coupling members under various working loads.

EUGENE E. LANDAHL.

REFERENCES CITED

The following references are of record in the file of this patent:

UNITED STATES PATENTS

| Number | Name | Date |
|---|---|---|
| 229,092 | Copen | June 22, 1880 |
| 441,998 | Williams | Dec. 2, 1890 |
| 807,254 | Evans | Dec. 12, 1905 |
| 807,255 | Evans | Dec. 12, 1905 |
| 1,237,932 | Marlin | Aug. 21, 1917 |
| 1,462,879 | Woodward | July 24, 1923 |
| 2,207,038 | Frier et al. | July 9, 1940 |